US012390818B2

United States Patent
Rother et al.

(10) Patent No.: US 12,390,818 B2
(45) Date of Patent: Aug. 19, 2025

(54) NOZZLE BODY

(71) Applicant: Aero Pump GmbH, Hochheim/Main (DE)

(72) Inventors: Sebastian Rother, Mainz (DE); Milena Angelika Marszalek, Mainz (DE)

(73) Assignee: Aero Pump GmbH, Hochheim/Main (DE)

( * ) Notice: Subject to any disclaimer, the term of this patent is extended or adjusted under 35 U.S.C. 154(b) by 457 days.

(21) Appl. No.: 18/101,313

(22) Filed: Jan. 25, 2023

(65) Prior Publication Data

US 2023/0234082 A1 Jul. 27, 2023

(30) Foreign Application Priority Data

Jan. 26, 2022 (DE) ...................... 10 2022 101 749.4

(51) Int. Cl.
  *B05B 1/34* (2006.01)
  *B33Y 40/20* (2020.01)
  *B33Y 80/00* (2015.01)

(52) U.S. Cl.
  CPC ................ *B05B 1/34* (2013.01); *B33Y 40/20* (2020.01); *B33Y 80/00* (2014.12)

(58) Field of Classification Search
  CPC ...... B05B 1/34; B23K 26/389; B29C 45/0053
  See application file for complete search history.

(56) References Cited

U.S. PATENT DOCUMENTS

| 4,074,861 A | * | 2/1978 | Magers | B65D 83/20 |
| | | | | 239/492 |
| 2006/0103051 A1 | * | 5/2006 | Staats | H01J 49/167 |
| | | | | 422/503 |

FOREIGN PATENT DOCUMENTS

WO WO-2010/076012 A1 * 7/2010 ............ A61M 15/00

* cited by examiner

*Primary Examiner* — James Sanders
(74) *Attorney, Agent, or Firm* — GREENBLUM & BERNSTEIN, P.L.C.

(57) ABSTRACT

A method for producing a nozzle body and a nozzle body. The method includes at least partially processing a nozzle body blank produced by one of an injection molding process or a 3D printing process by laser processing to form the nozzle body. The nozzle body includes a frusto-conical section; at least one nozzle bore having a diameter of less than or equal to 300 μm coupling the frusto-conical section to an outside of the nozzle body; and at least one turbulence channel that is configured to communicate with the frusto-conical section and to taper in a direction toward the frusto-conical section.

9 Claims, 1 Drawing Sheet

NOZZLE BODY

CROSS-REFERENCE TO RELATED APPLICATION

Figure 1:
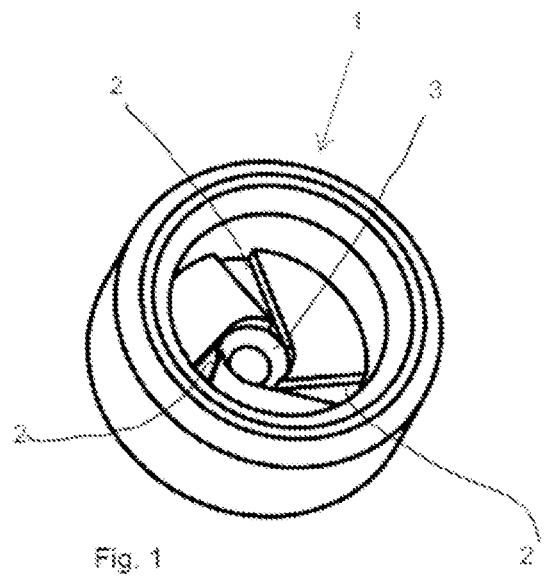

This application claims priority under 35 U.S.C. § 119(a) to German Application No. 10 2022 101 749.4 filed Jan. 26, 2022, the disclosure of which is expressly incorporated by reference herein in its entirety.

BACKGROUND

1. Field of the Invention

Embodiments are directed to a method for producing a nozzle body from a nozzle body blank produced by injection molding or a 3D printing process. Furthermore, embodiments relate to a nozzle body, in which a nozzle body blank is produced by an injection molding process or 3D printing process.

2. Discussion of Background Information

In an injection molding process, plastic is pressed into a mold so that, with the injection molding process, a host of different geometries are producible, which geometries are subject to some limitations. Thus, a diameter of cavity-shaped geometries has a lower limit, for example. Furthermore, undercuts, for example, can only be realized to a limited extent in the scope of the injection molding process.

A 3D printing process is an additive manufacturing process in which material is applied layer-by-layer so that a three-dimensional form results. The 3D printing process is thereby subject to some limitations, as a consequence of which the design freedom is limited.

SUMMARY

Embodiments are directed to a method for producing a nozzle body, in which large design freedom is present.

After the injection molding or 3D printing process, the nozzle body blank is at least partially processed to form the nozzle body by a laser processing. With the laser processing, the blank produced beforehand by the injection molding process or 3D printing process can be processed in accordance with defined specifications, so that a large design freedom of the nozzle body is achieved. For instance, first nozzle geometries can thereby be created, for example, by the injection molding process or 3D printing process, and second nozzle geometries can then be created by the laser processing.

Preferably, at least one nozzle geometry is produced by the laser processing. A nozzle geometry is, among other things, understood as meaning a surface, a notch, an undercut, or the like. As a result of the nozzle geometry, liquid is converted into a liquid mist, also known as aerosols, wherein the liquid is ejected out of the nozzle body as liquid mist. The laser processing thus contributes to a nozzle geometry that results in a good conversion of the liquid into the liquid mist.

Preferably, at least one nozzle bore is produced by the laser processing. With the laser processing, the nozzle bore can comprise different cross-sections and cross-section geometries, for example, so that various properties of different liquids can be taken into account in this case. As a result, a good design freedom of the nozzle body is achieved.

Preferably, the nozzle bore is produced with a diameter of less than 300 µm by the laser processing. The term "less than" (<) shall be understood as meaning "less than or equal to" (≤). It can thereby be roughly stated that a smaller diameter results in a finer liquid mist. The diameter of the nozzle bore is thereby essentially limited by a focus point in the diameter of the laser of the laser processing. Smaller diameters, such as 250 µm, 200 µm, 150 µm, or 100 µm, for example, or diameters between these values, are likewise possible. A large design freedom of the diameter is thus possible with these bores.

Preferably, the laser processing comprises methods of laser ablation, laser drilling, and/or 3D laser ablation. Laser ablation refers to the removal of material from a surface through bombardment by a pulsed laser. The laser or the laser radiation thereby leads to a rapid heating and, consequently, the formation of a plasma on the surface of the workpiece. Laser drilling is likewise a non-cutting processing method in which, by laser radiation, so much energy is introduced into the workpiece that the material is fused and partially evaporated. 3D laser ablation is a special configuration of laser ablation in which material is processed in three dimensions. Furthermore, a combination of the stated methods is possible, for example. This results in a large design freedom and a large flexibility.

The nozzle body preferably comprises a hollow-cone geometry. In a hollow-cone nozzle, the liquid that is to be atomized is set in a rotational motion. This results in a fine liquid mist.

Embodiments are directed to a nozzle body blank that is at least partially processed to form a nozzle body by a laser processing. Consequently, the nozzle body blank is converted into a nozzle body by the at least partial laser processing. With the laser processing, the most widely varying geometries can be produced, such as undercuts, notches, recesses, planar processing, or the like, for example. In addition to the laser processing, nozzle geometries can be realized by the injection molding process or 3D printing process, for example. A large design freedom is thus achieved.

Preferably, the laser processing comprises methods of laser ablation, laser drilling, and/or 3D laser ablation. In laser ablation, material is removed from a surface through bombardment with a pulsed laser beam or pulsed laser radiation. In laser drilling, so much energy is locally introduced into the workpiece by laser radiation that the material is fused and partially evaporated. A fusing of the material at the edge of the bore is thereby not desired. Likewise feasible, for example, is a combination of the stated methods. As a result, a good design freedom of the nozzle or the nozzle body is achieved.

Preferably, at least one nozzle bore is produced by the laser processing. In the broadest sense, each nozzle body comprises an opening through which the liquid passes to the outside. With the laser processing, different geometries of the nozzle bore, such as different cross-section geometries or the like, for example, can be produced. It is thus possible to take various properties, such as the density and/or the viscosity, for example, into account. As a result, the nozzle body can be easily adapted to different liquids.

Preferably, the nozzle bore is produced with a diameter of less than 300 µm by the laser processing. A minimum diameter is thereby determined, for example, by a focus point of the laser in the laser processing, so that any diameter that lies between the dimensions of the focus point and 300 µm is produced. This allows a large design freedom.

Preferably, the nozzle body comprises a hollow-cone nozzle geometry. In a hollow-cone nozzle geometry, liquid is first set in rotational motion before the liquid passes out of the nozzle body to the outside through the nozzle bore. A fine liquid mist is thus achieved. With the laser processing, the hollow-cone nozzle geometry can thereby be adapted to properties of the liquid that is to be atomized.

This enables a flexible use of the nozzle body blank, so that various nozzle bodies with different geometries can be produced from one nozzle body blank. As a result, a good design freedom is achieved.

Furthermore, the nozzle body can comprise a material having at least one principal component from the group PMMA (poly(methyl methacrylate)), POM (polyoxymethylene), PP (polypropylene), PE (polyethylene), ABS (acrylonitrile-butadiene-styrene copolymer), COC (cycloolefin copolymer), PA (polyamide), PC (polycarbonate), PBT (poly(butylene terephthalate)), PEEK (poly(ether ether ketone)), PEI (polyetherimide), PET (poly(ethylene terephthalate)), and PPE (poly(phenylene ether)). These materials would belong to the thermoplastic materials and can can be easily processed, alone or in combination, using injection molding processes or 3D printing processes. A combination is, for example, a mixture of PE and PP.

Embodiments are directed to a method for producing a nozzle body that includes at least partially processing a nozzle body blank produced by one of an injection molding process or a 3D printing process by laser processing to form the nozzle body.

In embodiments, the at least partially processing can include producing by the laser processing at least one nozzle geometry in the nozzle body blank. The at least one nozzle geometry may include a surface, notch or undercut configured to convert a liquid into an aerosol to be ejected from the nozzle body.

According to other embodiments, the at least partially processing may include producing by the laser processing at least one nozzle bore in the nozzle body blank. The nozzle bore can be produced by the laser processing has a diameter less than or equal to 300 μm. The nozzle bore produced by the laser processing can have diameter less than or equal to 100 μm.

In accordance with embodiments, the laser processing may include at least one of laser ablation, laser drilling, and 3D laser ablation.

According other embodiments, the nozzle body can include a hollow-cone geometry.

In embodiments, the nozzle body blank may include at least one of PMMA (poly(methyl methacrylate)), POM (polyoxymethylene), PP (polypropylene), PE (polyethylene), ABS (acrylonitrile-butadiene-styrene copolymer), COC (cycloolefin copolymer), PA (polyamide), PC (polycarbonate), PBT (poly(butylene terephthalate)), PEEK (poly (ether ether ketone)), PEI (polyetherimide), PET (poly(ethylene terephthalate)), and PPE (poly(phenylene ether)).

Embodiments are directed to a nozzle body that includes an injection molded or 3D printed nozzle body blank that is a least partially processed by laser processing.

According to embodiments, the laser processing can include at least one of laser ablation, laser drilling, and 3D laser ablation.

In accordance with embodiments, at least one nozzle bore may be produced by the at least partially processing of the nozzle body blank by the laser processing.

In embodiments, the at least one nozzle bore can have a diameter of less than or equal to 300 μm. Moreover, the at least one nozzle bore may have a diameter less than or equal to 100 μm.

According to other embodiments, the nozzle body may further include a hollow-cone nozzle geometry.

In still other embodiments, the nozzle body may also include at least one nozzle geometry that is a surface, a notch or an undercut that is configured to convert a liquid into an aerosol to be ejected from the nozzle body. The at least one nozzle geometry can include at least one turbulence channel recessed below a surface of the nozzle body blank and a frusto-conical section recessed below the at least one turbulence channel. Further, the at least one turbulence channel can be structured to taper toward the frusto-conical section.

In accordance with still yet other embodiments, the nozzle body blank may include at least one of PMMA (poly(methyl methacrylate)), POM (polyoxymethylene), PP (polypropylene), PE (polyethylene), ABS (acrylonitrile-butadiene-styrene copolymer), COC (cycloolefin copolymer), PA (polyamide), PC (polycarbonate), PBT (poly(butylene terephthalate)), PEEK (poly(ether ether ketone)), PEI (polyetherimide), PET (poly(ethylene terephthalate)), and PPE (poly(phenylene ether)).

Embodiments are directed to a nozzle body that includes: a frusto-conical section; at least one nozzle bore having a diameter of less than or equal to 300 μm coupling the frusto-conical section to a nozzle outlet surface; and at least one turbulence channel that is configured to communicate with the frusto-conical section and to taper in a direction toward to the frusto-conical section.

Other exemplary embodiments and advantages of the present invention may be ascertained by reviewing the present disclosure and the accompanying drawing.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein:

FIG. 1 shows a schematic illustration of a nozzle body blank,

FIG. 2 shows a schematic top view of a nozzle body blank,

FIG. 3 shows a schematic sectional illustration of a nozzle body blank,

FIG. 4 shows a schematic sectional illustration of a nozzle body, and

FIG. 5 shows an enlarged view of a nozzle bore of a nozzle body.

DETAILED DESCRIPTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the several forms of the present invention may be embodied in practice.

FIG. 1 shows a perspective view of a nozzle body blank 1 that has been produced by an injection molding process or 3D printing process. The produced nozzle body blank 1 may include, to the extent that is it possible by the injection molding process or 3D printing process, several nozzle geometries, such as plural turbulence channels 2. e.g., three turbulence channels, and a frusto-conical section 3. However, the produced nozzle body blank 1 does not yet have a nozzle bore.

Figure 2:
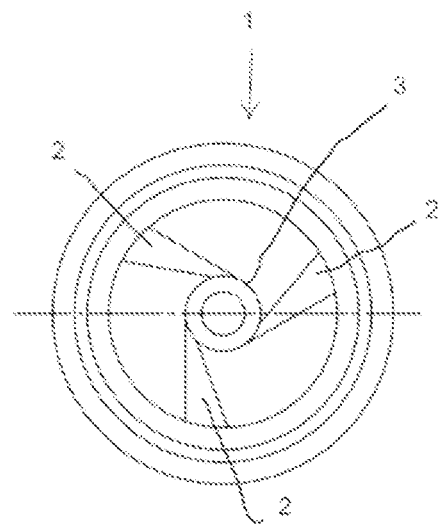

FIG. 2 shows a schematic top view of the nozzle body blank 1. It can thereby be recognized that, while the nozzle bore has not yet been produced, to the extent possible, turbulence channels 2 and frusto-conical section 3 are provided in nozzle body blank 1.

Figure 3:
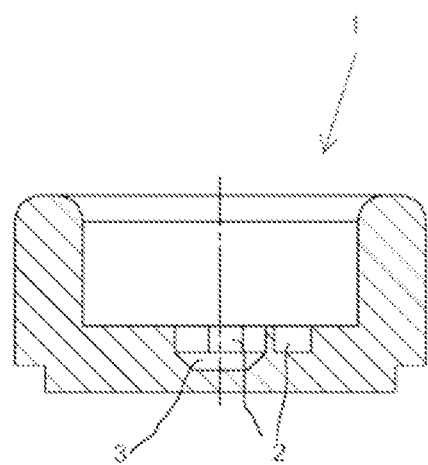

FIG. 3 shows a schematic sectional illustration of nozzle body blank 1 in FIG. 2, which includes turbulence channels 2 and the frusto-conical section 3. As noted above, these nozzle geometries are produced in the nozzle body blank 1, to the extent possible, by the injection molding process or 3D printing process. In this regard, nozzle geometries having dimensions greater than 300 μm can be produced by the injection molding process or 3D printing process in nozzle body blank 1.

Figure 4:
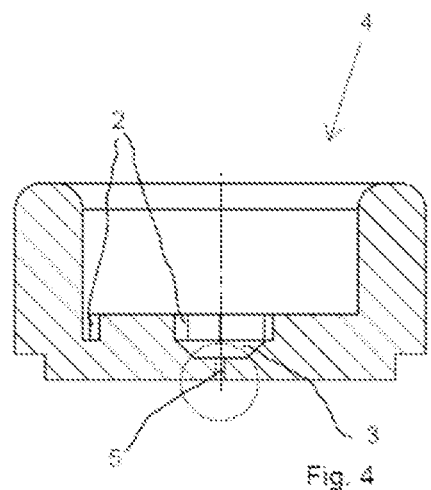

FIG. 4 shows a schematic sectional view of a completed nozzle body 4. Like nozzle body blank 1, nozzle body 4 likewise comprises turbulence channels 2 and a frusto-conical section 3. Further, nozzle body 4 comprises a nozzle bore 5, which has been produced in nozzle body blank 1 by laser processing.

Figure 5:
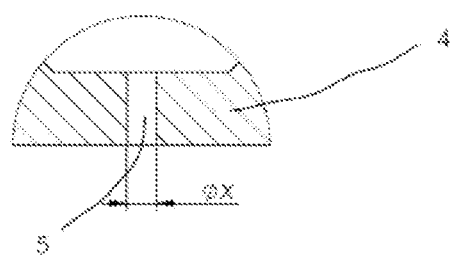

Nozzle bore 5, which is schematically illustrated in FIG. 5, shows the detailed portion of nozzle body 4 in FIG. 4. Nozzle bore 5 is formed with a diameter X which, in the present case, is any diameter less than 300 μm, in particular 250 μm or less, 200 μm or less, 150 μm or less, or 100 μm or less. Preferably, the diameter X of nozzle bore 5 is less than 100 μm. The term "less than" (<) shall be understood as meaning "less than or equal to" (≤).

While some of the nozzle geometries, such as, e.g., turbulence channels 2 and/or frusto-conical section 3, may be produced by the injection molding process or the 3D printing process, nozzle bore 5 is produced by laser processing. Moreover, it is understood that nozzle, alternatively or additionally, the nozzle geometries, e.g., frusto-conical section 3 and/or turbulence channels 2, in nozzle body blank 1 can be formed entirely or further defined/created via laser processing of nozzle body blank 1. In this regard, in contrast to nozzle body blank 1 illustrated in FIG. 1, a nozzle body blank can be produced without a frusto-conical section 3 and/or turbulence channels 2 via the injection molding process or 3D printing process, as well as without a nozzle bore. Frusto-conical section 3 and/or turbulence channels 2 may be created in the injection molded or 3D printed nozzle body blank laser processing methods. While the nozzle blank 1 illustrated in FIGS. 1-3 shows three turbulence channels 2, it is understood that this number of turbulence channels 2 is merely an example and can differ from the number depicted without departing from the spirit and scope of the claimed embodiments.

A principal component of nozzle body 4 or nozzle body blank 1 is a plastic material. With the plastic material, laser processing is possible in which a laser beam first penetrates into the workpiece (nozzle body blank 1) and processes the workpiece on a surface lying opposite of the penetration site. Furthermore, laser ablation, laser drilling, and/or 3D laser ablation and combinations thereof can be understood to be within the scope of the laser processing described in this application.

A principal component of nozzle body blank 1 is selected in accordance with the laser processing method to be used in forming the nozzle body. By way of example, transparency properties of the plastic material can be taken into account. Thus, in the course of the processing by the laser ablation described above, transparent plastic is used as a principal component of the nozzle body blank 1. For other laser processing methods, non-transparent plastics can also be used. The nozzle body blank/nozzle body can comprise at least one of the following materials as the principal component: PMMA (poly(methyl methacrylate)), POM (polyoxymethylene), PP (polypropylene), PE (polyethylene), ABS (acrylonitrile-butadiene-styrene copolymer), COC (cycloolefin copolymer), PA (polyamide), PC (polycarbonate), PBT (poly(butylene terephthalate)), PEEK (poly(ether ether ketone)), PEI (polyetherimide), PET (poly(ethylene terephthalate)), and PPE (poly(phenylene ether)). A combination of the stated principal components can also be used, such as, e.g., a mixture of PE and PP.

Laser ablation, also called pulsed laser deposition, refers to removal of material from a surface by bombardment with pulsed laser radiation. The laser radiation used here, which has a high power density, leads to a rapid heating and formation of a plasma on the surface.

In laser drilling, so much energy is locally introduced into the workpiece by laser radiation that the material is fused and partially evaporated. The ionized vapor is expelled by the different pressure between the ambient environment and the location of the bore. A fusing of the material at the edge of the bore is thereby not desired.

3D laser ablation corresponds to the laser ablation previously described above, with the workpiece being processed in three-dimensional space by the 3D laser ablation. As a result, an undercut or other geometries can be produced, for example.

It is noted that the foregoing examples have been provided merely for the purpose of explanation and are in no way to be construed as limiting of the present invention. While the present invention has been described with reference to an exemplary embodiment, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular means, materials and embodiments, the present invention is not intended to be limited to the particulars disclosed herein; rather, the present invention extends to all functionally equivalent structures, methods and uses, such as are within the scope of the appended claims.

LIST OF REFERENCE NUMERALS

1 Nozzle body blank
2 Turbulence channels
3 Frusto-conical section
4 Nozzle Body
5 Nozzle bore

What is claimed:
1. A method for producing a nozzle body comprising:
at least partially processing a nozzle body blank produced by one of an injection molding process or a 3D printing process by laser processing to form the nozzle body; wherein the nozzle body has a frusto-conical section and at least one turbulence channel created by laser processing.

2. The method according to claim 1, wherein the at least partially processing comprises producing by the laser processing at least one nozzle geometry in the nozzle body blank.

3. The method according to claim 1, wherein the at least partially processing comprises producing by the laser processing at least one nozzle bore in the nozzle body blank.

4. The method according to claim 3, wherein the nozzle bore produced by the laser processing has a diameter less than or equal to 300 µm.

5. The method according to claim 1, wherein the laser processing comprises at least one of laser ablation, laser drilling, and 3D laser ablation.

6. The method according to claim 1, wherein the nozzle body comprises a hollow-cone geometry.

7. The method according to claim 2, wherein the at least one nozzle geometry comprises a surface, notch or undercut configured to convert a liquid into an aerosol to be ejected from the nozzle body.

8. The method according to claim 4, wherein the nozzle bore produced by the laser processing has a diameter less than or equal to 100 µm.

9. The method according to claim 1, wherein the nozzle body blank comprises at least one of PMMA (poly(methyl methacrylate)), POM (polyoxymethylene), PP (polypropylene), PE (polyethylene), ABS (acrylonitrile-butadiene-styrene copolymer), COC (cycloolefin copolymer), PA (polyamide), PC (polycarbonate), PBT (poly(butylene terephthalate)), PEEK (poly(ether ether ketone)), PEI (polyetherimide), PET (poly(ethylene terephthalate)), and PPE (poly(phenylene ether)).

* * * * *